May 30, 1961 S. C. MOON 2,986,266
ENDLESS BELT CONVEYOR
Filed Aug. 5, 1957 8 Sheets-Sheet 1
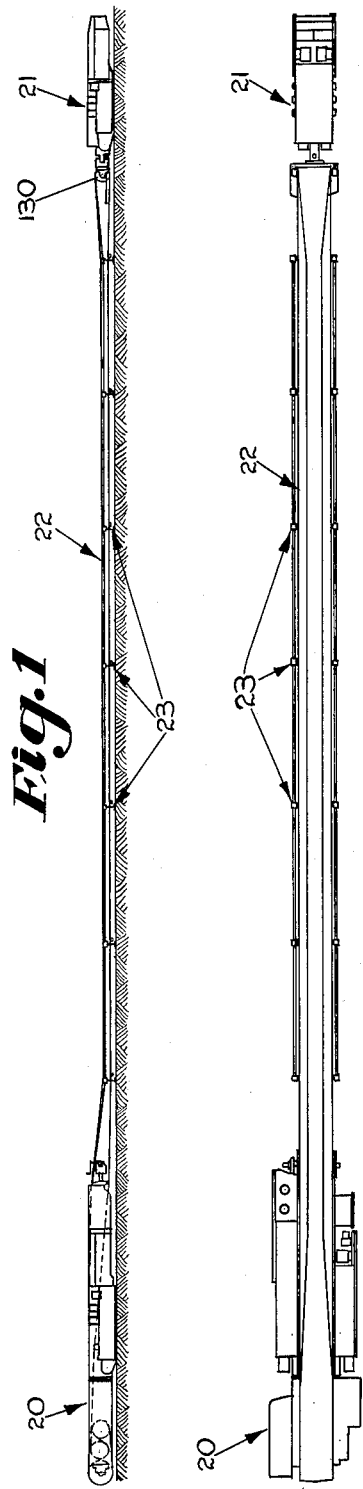
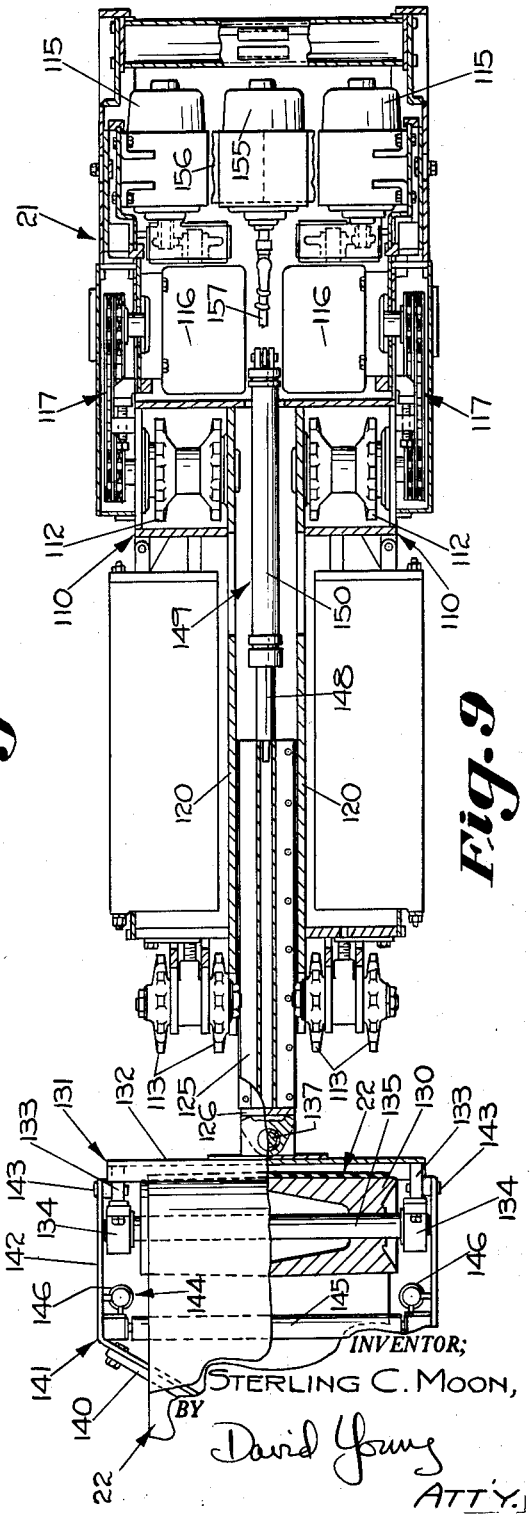
INVENTOR;
STERLING C. MOON,
BY
David Young
ATTY.

May 30, 1961 S. C. MOON 2,986,266
ENDLESS BELT CONVEYOR
Filed Aug. 5, 1957 8 Sheets-Sheet 2
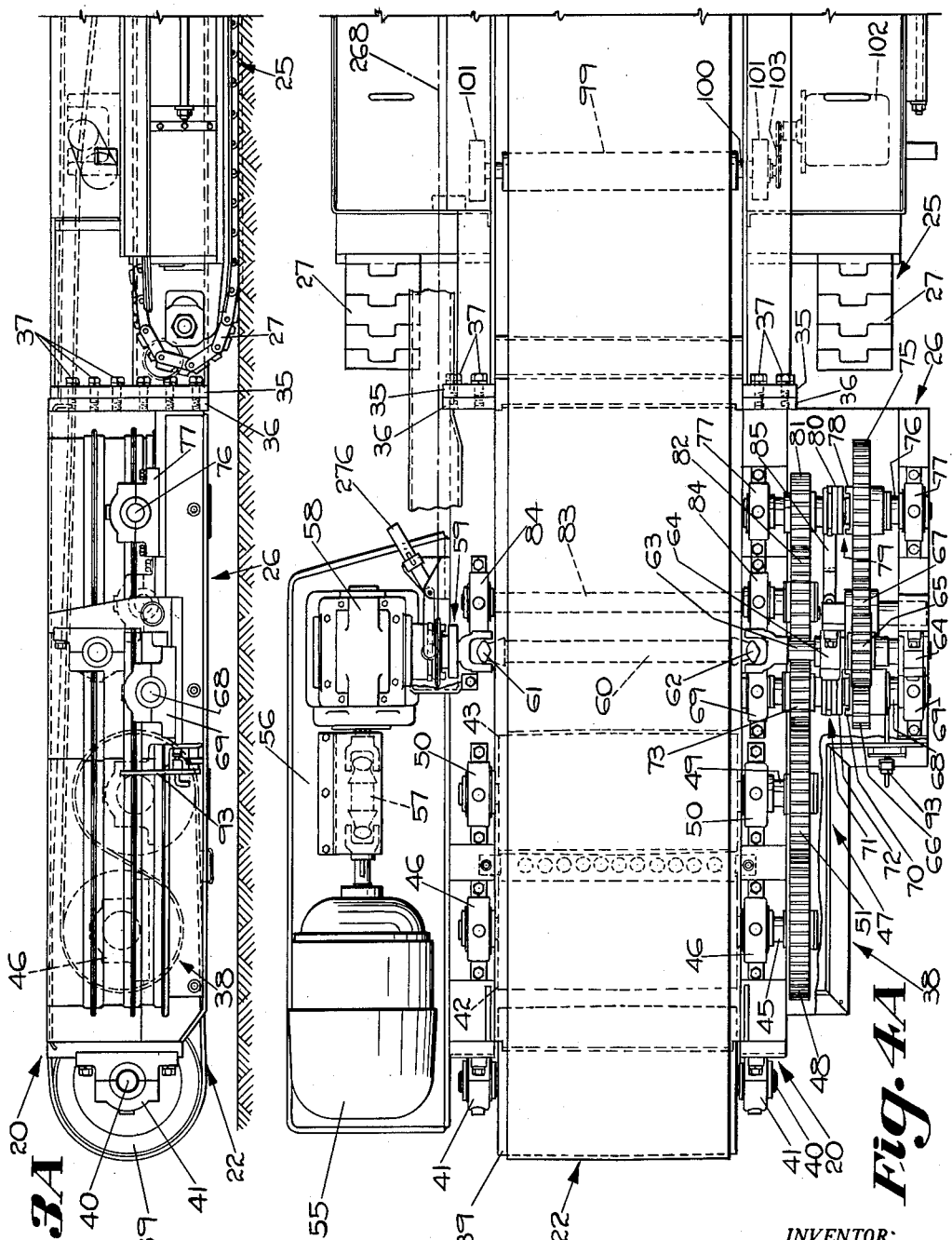
INVENTOR;
STERLING C. MOON,
BY David Young
ATTY.

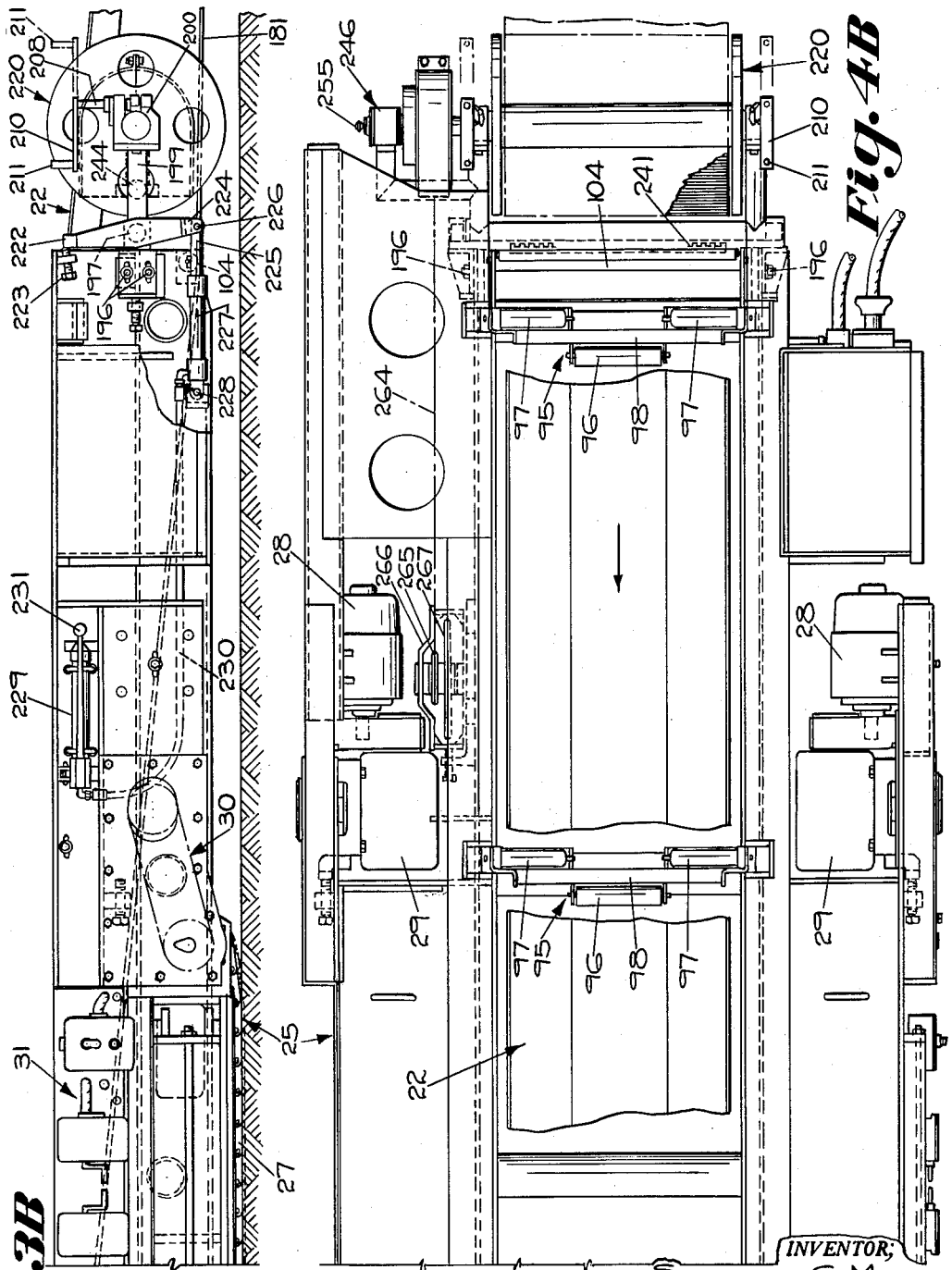

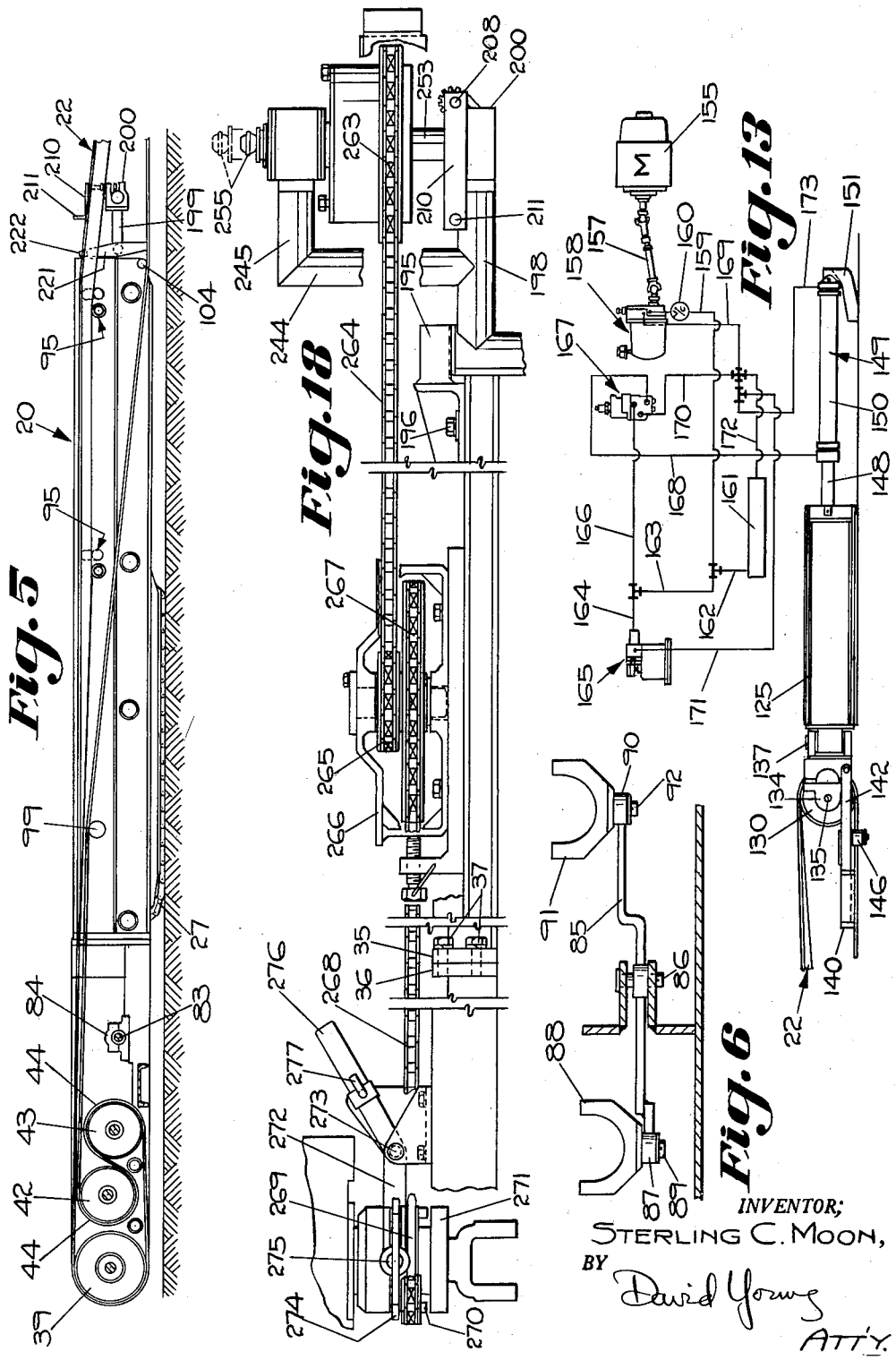

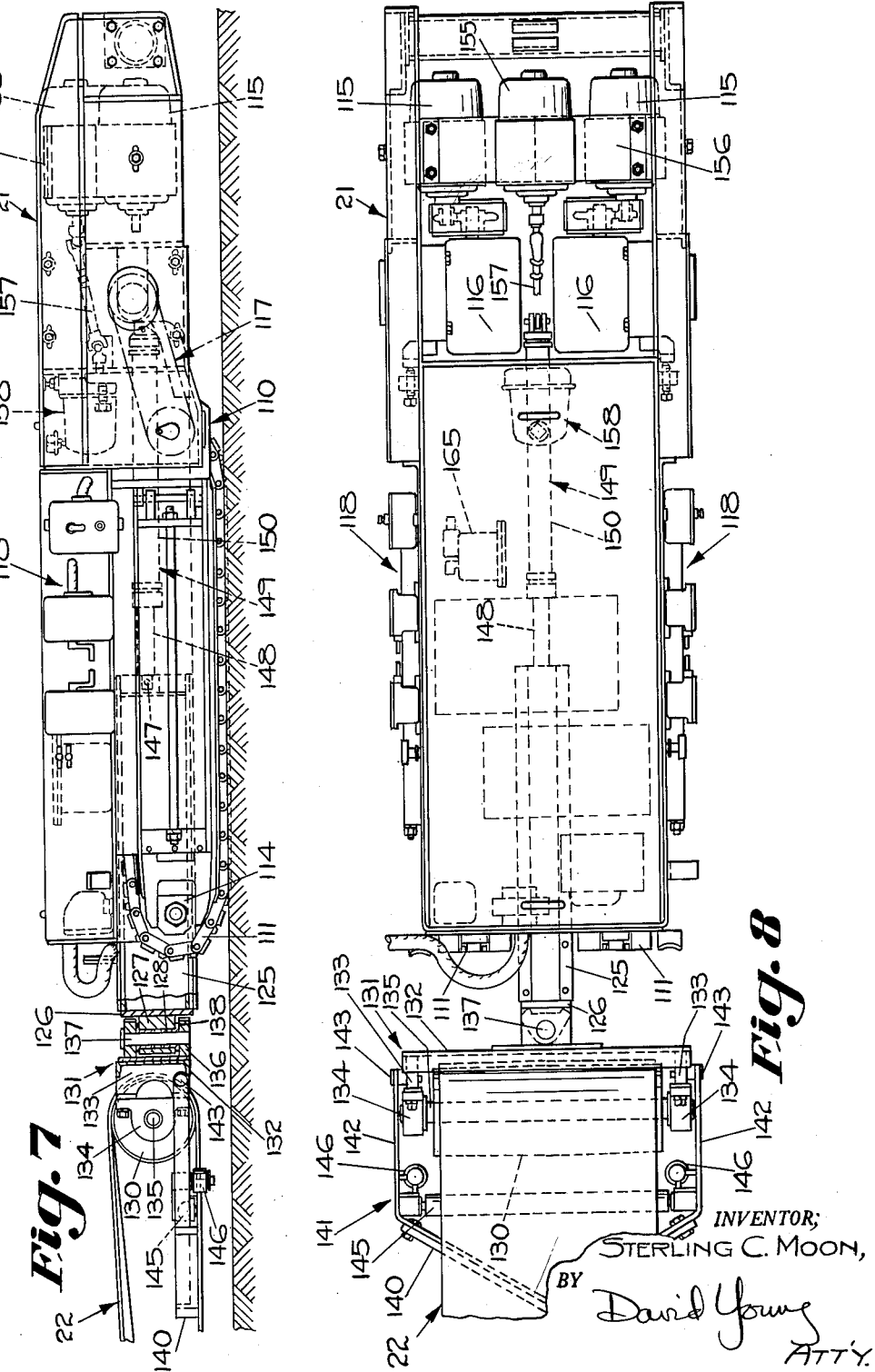

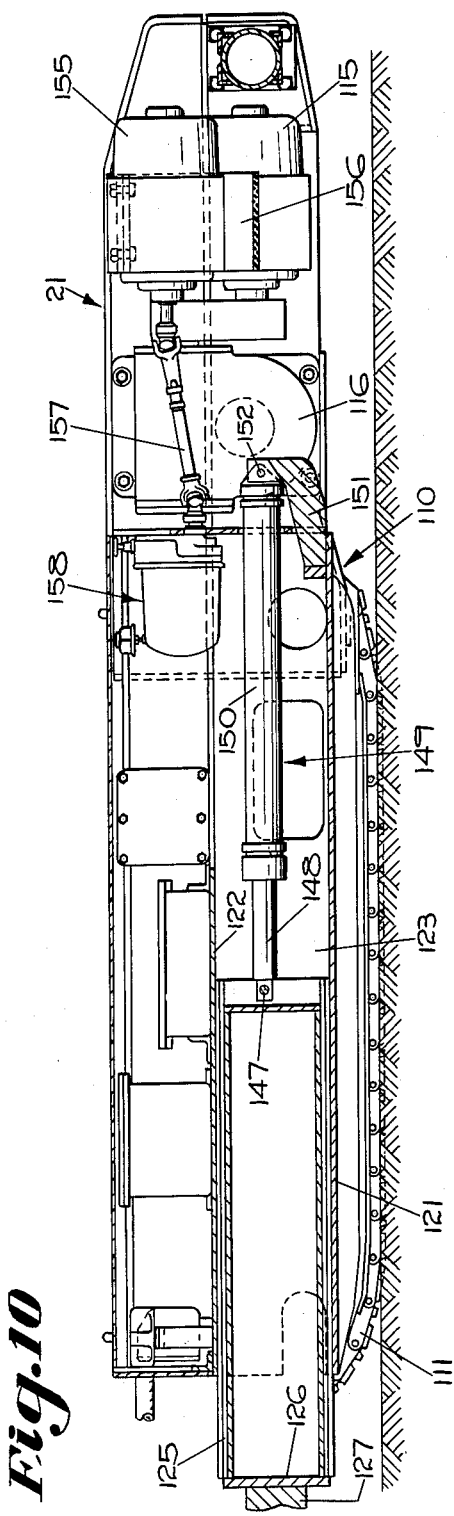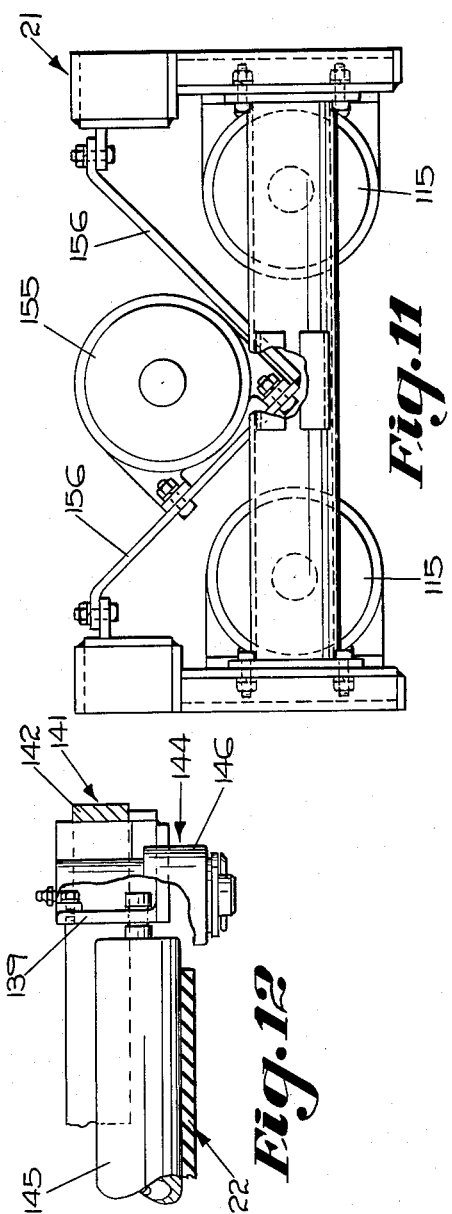

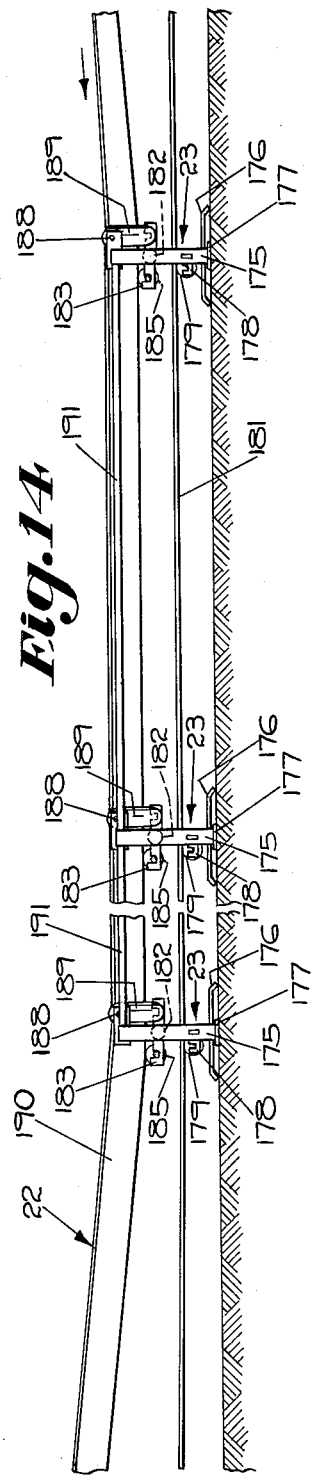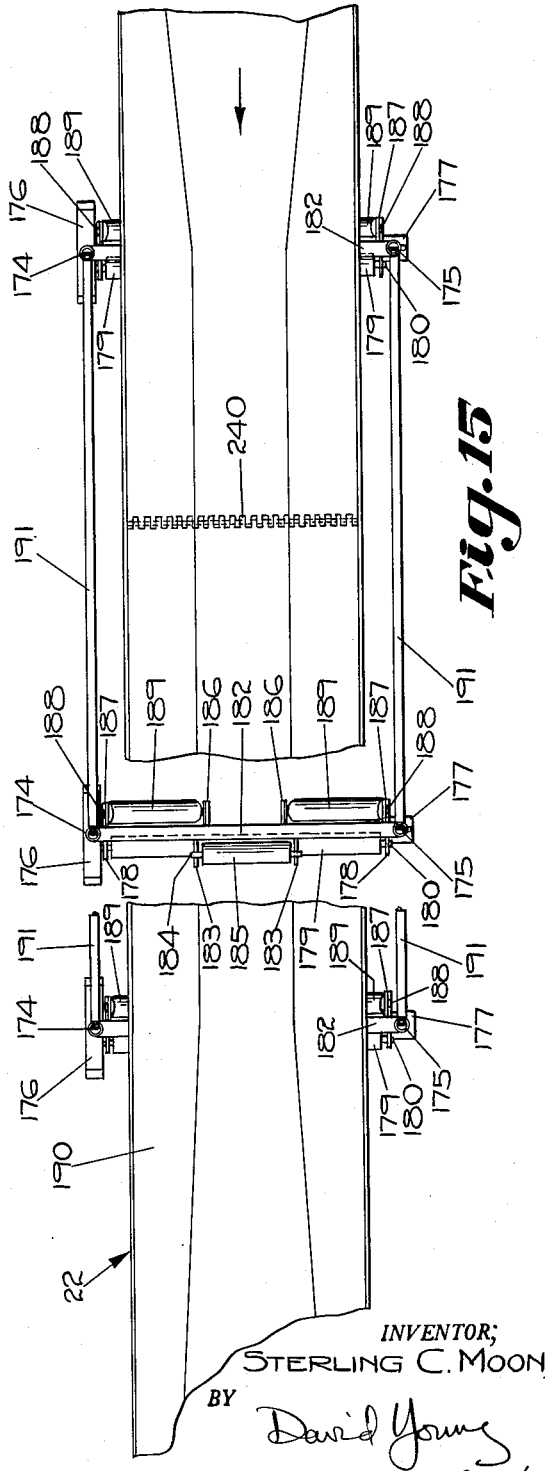

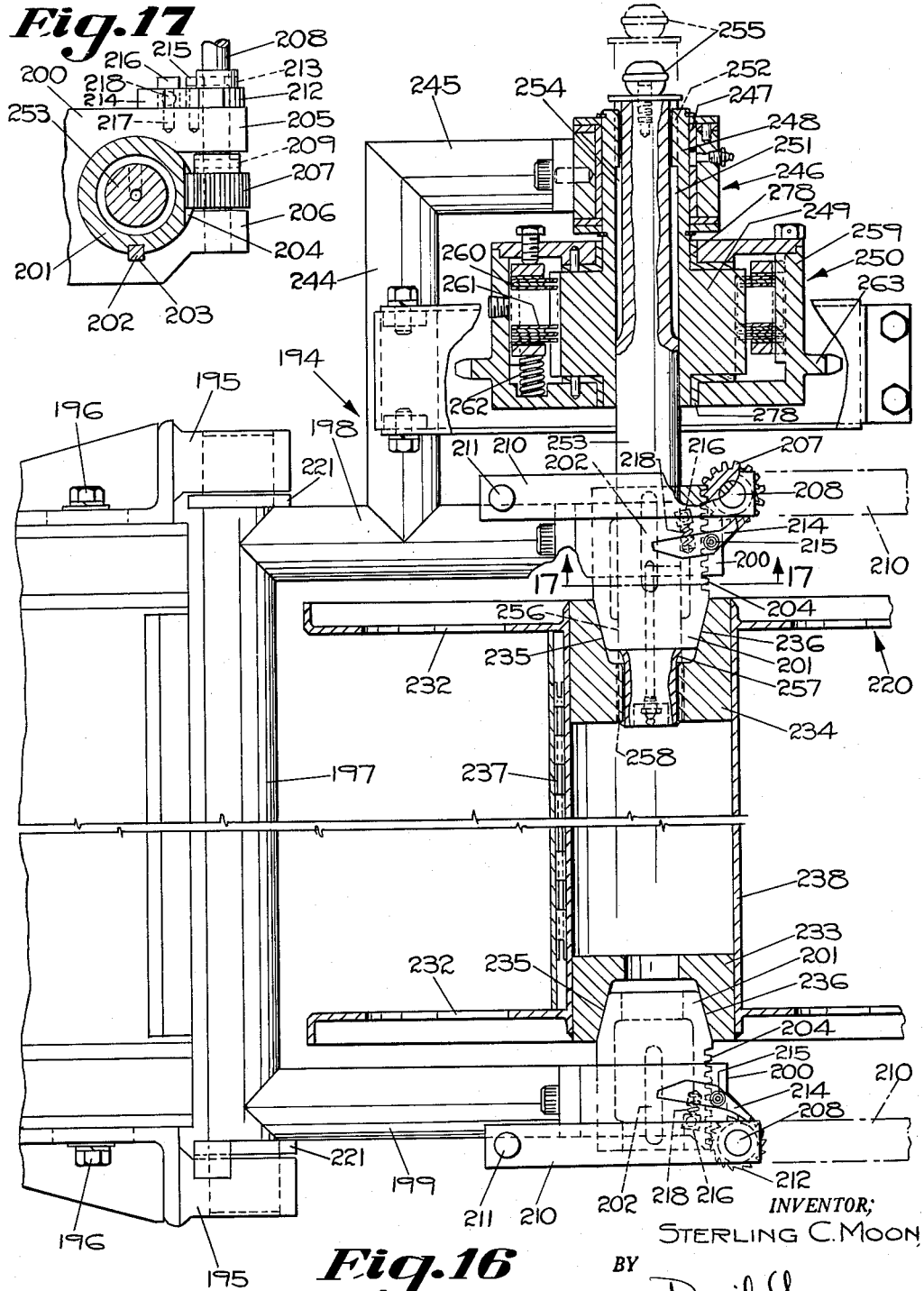

United States Patent Office 2,986,266
Patented May 30, 1961

2,986,266
ENDLESS BELT CONVEYOR
Sterling C. Moon, Dublin, Ohio, assignor to The Jeffrey Manufacturing Company, a corporation of Ohio
Filed Aug. 5, 1957, Ser. No. 676,266
10 Claims. (Cl. 198—139)

This invention relates to endless belt conveyors, and more particularly to a conveyor of the type that is particularly adapted for use in a mine as a room conveyor, the conveyor being extensible so that it may be extended further into the mine as the mining operation progresses, whereby the conveyor, in effect, follows the mining machines which remove the material from the mine. The conveyor of the instant invention comprises a head section which includes the various mechanisms for driving the endless conveyor belt, and this head section is fixed at a point in the mine at which the material can be conveniently discharged from the conveyor for removal from the mine. At its opposite end the conveyor of this invention includes a tail section which is a mobile unit that can be trammed further into the mine as the mining operation progresses, and each time that the tail section is propelled deeper into the mine an additional length of conveyor belt is added to the endless conveyor belt to increase the length thereof. The mined material is delivered to the conveyor at any point along its length, although this will usually occur near the tail section, the mined material being discharged onto the conveyor by a shorter auxiliary conveyor spanning the distance between the mining machine and the room conveyor, or the material may be discharged directly onto the room conveyor by a continuous mining machine.

It is the prime object of the instant invention to provide an endless belt conveyor which can be extended to increase the length thereof.

It is a further object of the instant invention to provide an endless belt conveyor having a head section and a tail section between which the endless belt extends, in which the conveyor can be extended by adding a length of conveyor belt thereto and tramming the tail section in a direction away from the head section to allow for the added length of belt.

It is another object of the instant invention to provide a novel means in an endless belt conveyor for driving the belt.

It is a further object of the instant invention to provide an endless belt conveyor, in which the tail end thereof includes a mobile unit with means for guiding and supporting the endless belt at the tail end of the conveyor, the mobile tail unit being formed compactly and with a relatively narrow width to facilitate maneuvering the mobile tail unit in a mine.

It is also an object of the instant invention to provide an endless belt conveyor in which the tail section includes a tail pulley for supporting the belt at the tail end of the conveyor and tension means connected to the tail pulley to exert a pull on the belt.

It is still another object of the instant invention to provide an endless belt conveyor having an end pulley that is pivotally mounted for swinging movement in a direction laterally of the run of the endless belt, and in which the assembly of the end pulley includes training means for maintaining the endless belt in proper alignment with the end pulley.

Still a further object of the instant invention is to provide a novel method of extending an endless belt conveyor comprising the steps of breaking the belt to provide a free end of belt, attaching a length of belt to the free end so formed, and pulling the length of belt into the run of the conveyor by moving one end pulley in a direction away from the other end pulley, thereby increasing the length of the conveyor between the end pulleys.

Other objects of the invention will appear hereinafter, the novel features and combinations being set forth in the appended claims.

In the accompanying drawings:

Fig. 1 is an elevational view of the conveyor of the instant invention;

Fig. 2 is a plan view of the conveyor of this invention;

Figs. 3A and 3B together form a side elevational view of the conveyor head section;

Figs. 4A and 4B together form a top plan view of the conveyor head section;

Fig. 5 illustrates diagrammatically the path of the conveyor belt through the head section;

Fig. 6 is a detail view of the clutch operating means in the drive for the conveyor belt;

Fig. 7 is a side elevational view of the conveyor tail section;

Fig. 8 is a top plan view of the tail section;

Fig. 9 is a view of the tail section similar to Fig. 8 with certain parts broken away;

Fig. 10 is an elevational view in section of the tail section;

Fig. 11 shows the arrangement of the motors on the tail section;

Fig. 12 is a detail view of the training idler;

Fig. 13 shows the hydraulic circuit in the conveyor tail section;

Fig. 14 is an elevational view showing the stands for supporting the conveyor belt between the head and tail sections;

Fig. 15 is a plan view showing the belt supporting stands;

Fig. 16 is a view partially in section showing the carrier for raising a belt reel into position for adding a length of belt to the conveyor;

Fig. 17 shows the operating means for inserting the centering bearing into the hub of the belt reel taken on the line 17—17 in Fig. 16; and Fig. 18 shows the driving connections for rotating the belt reel.

Referring to Figs. 1 and 2 of the drawings, the extensible endless belt conveyor of this invention comprises a conveyor head section 20 and a conveyor tail section 21. An endless conveyor belt 22 extends between the head section 20 and the tail section 21. A plurality of stands 23 are disposed along the length of the conveyor between the head section 20 and the tail section 21, and these support the upper and lower runs of the conveyor belt 22, as will appear in greater detail hereinafter.

The conveyor head section 20 includes means for driving the conveyor belt 22, as well as propelling means for the purpose of moving the head section 20 to the desired location in the mine. Once the head section 20 is located in the mine it will remain fixed at that position until such time as the entire conveyor is relocated. The tail section 21 includes an idler tail pulley 130 about which the endless belt 22 is trained. The tail section 21 also includes propelling means so that the tail section 21 may be moved deeper into the mine as the mining operation progresses. Each time that the tail section 21 is moved further away from the head section 20 an additional length of conveyor belt is added to the endless conveyor belt 22, thereby increasing the length of the conveyor. At such time as the length of the conveyor is increased, a sufficient number of additional stands 23 is added to the conveyor to provide adequate support for the endless belt 22 between the head section 20 and the tail section 21.

The endless belt conveyor of this invention is adapted to be used as a room conveyor in a mine, in which the conveyor extends a substantial distance through the mine, with the mined material being delivered to the room conveyor at various positions along the length thereof, the room conveyor operating to carry the mined material to the head section 20 from which the mined material is delivered to a suitable conveyance which takes the mined material out of the mine.

The conveyor head section 20 comprises a traction assembly 25 and a belt driving assembly 26. The traction assembly 25 of the conveyor head section 20 includes a pair of endless crawler traction treads 27, located one at either side of the traction assembly 25. Each of the endless crawler traction treads 27 is independently operated by a motor 28, mounted at the side of the traction assembly 25 and connected to a gear box 29, the drive of which is operatively connected to the traction treads 27 by means of chain and sprocket drive means 30. The controls 31 for operating the traction treads 27 are located on one side of the traction assembly 25 immediately above one of the traction treads 27.

The traction assembly 25 at its rear end is formed with two upright flanges 35, one at each side thereof. The front end of the belt driving assembly 26 is formed with a pair of flanges 36, disposed one at each side thereof, and opposite the flanges 35. These flanges 35, 36 are secured to each other by a plurality of bolts 37, to thereby unite the belt driving assembly 26 with the traction assembly 25 to form the conveyor head section 20.

The belt driving assembly 26 comprises a frame 38, on the end of which there is provided a head idler pulley 39 secured to a shaft 40, which is rotatably mounted in pillow blocks 41 secured to the frame 38. The conveyor belt 22 travels over the top of the conveyor head section 20 and down around the head pulley 39 to discharge the material from the conveyor. Immediately ahead of the head pulley 39 there are a pair of driving pulleys 42, 43 disposed closely adjacent each other. As the endless conveyor belt 22 comes down around the periphery of the head pulley 39 it runs along the bottom of the belt driving assembly 26 and upwardly around the periphery of the forwardmost driving pulley 43. The belt 22 is then trained down between the driving pulley 42 and the driving pulley 43, upwardly around the periphery of the driving pulley 42, and from the pulley 42 along the top of the belt driving assembly 26. Thus, the endless conveyor belt 22 is trained around the driving pulleys 42, 43 in a pair of driving bights 44, each of which is disposed on the periphery of one of the driving pulleys 42, 43 for driving engagement therewith.

The belt driving pulley 42 is secured to a shaft 45 which is rotatably mounted in pillow blocks 46 secured one at each side of the frame 38. One end of the shaft 45 extends beyond the pillow block 46 into the driving gear housing 47 at the side of the main frame 38. The projecting end of the shaft 45 has secured thereto a gear 48. Similarly, the driving pulley 43 is secured to a shaft 49 which is rotatably supported in pillow blocks 50, disposed one at each side of the frame 38, with a gear 51 being secured to a projecting end of the shaft 49 in the gear housing 47. The teeth of the gears 48, 51 are engaged with each other and are thereby driven in opposite directions, to rotate the belt driving pulleys 42, 43, whereby the pulleys 42, 43 drive the endless conveyor belt 22.

Power is supplied for operating the endless conveyor belt 22 by a motor 55 supported on a platform 56 at the side of the driving assembly 26 opposite that on which the gear housing 47 is disposed. A universally jointed shaft 57 connects the armature shaft of the motor 55 to a gear box 58. The drive 59 from the gear box 58 is directed laterally of the belt driving assembly 26. A drive shaft 60 extends across the belt driving assembly 26 and at one end thereof is connected to the drive 59 from the gear box 58 by a universal joint 61, and at the other end thereof is connected by a universal joint 62 to a short drive shaft 63. The drive shaft 63 is rotatably supported by pillow blocks 64 secured to the frame 38. A drive gear 65 is secured to the shaft 63 and is rotated thereby. The teeth of the drive gear 65 mesh with the teeth of the gear 66 and the gear 67, which gears are located below the drive gear 65, one at each side of the axis of the shaft 63 on which the gear 65 is mounted.

The gear 66 is idly mounted on a shaft 68, which is rotatably supported in pillow blocks 69 secured to the frame 38. The gear 66 includes the male portion 70 of a jaw clutch 71, the female portion 72 of which is slidably mounted on the shaft 68, and keyed to the shaft 68 for rotation therewith. Upon engagement of the female portion 72 of the jaw clutch 71 with the male portion 70 thereof, the gear 66 becomes locked to the shaft 68 and will rotate the shaft 68, thereby rotating also gear 73 which is secured to the shaft 68. The teeth of the gear 73 mesh with the teeth of the gear 51 to drive that gear which, in turn, drives the gear 48, thereby rotating the belt driving pulleys 42, 43, as previously described. The gears thus far described are operative to drive the conveyor belt 22 in a forward direction in which the load carrying run of the conveyor belt 22 moves from the tail section 21 towards the head section 20.

It is also desirable that the endless conveyor belt 22 be driven in a reverse direction at a lower speed for the purpose of transporting men, tools, and other small equipment into the mine on the endless belt 22. For the purpose of driving the endless conveyor belt 22 in the reverse direction, the teeth of the drive gear 65 mesh with the teeth of the gear 67 and drive this gear. The gear 67, in turn, meshes with the teeth of the gear 75, which is idly mounted on a shaft 76 rotatably supported at its ends in pillow blocks 77 secured to the frame 38. The gear 75 includes the male portion 78 of a jaw clutch 79, the female portion 80 of which is slidably mounted on the shaft 76, and keyed thereto for rotation with the shaft 76. Upon engagement of the female portion 80 of the jaw clutch 79 with the male portion 78 thereof, which is achieved by sliding the female portion 80 along the shaft 76 towards the male portion 78, the gear 75 will be locked to the shaft 76, and will rotate the shaft 76 as well as the gear 81, which is secured to the shaft 76 at the other side of the jaw clutch 79. The teeth of the gear 81 mesh with the teeth of a gear 82 which is secured to the end of a shaft 83 rotatably supported by pillow blocks 84 secured to the frame 38. The teeth of the gear 82 mesh with the teeth of the gear 73, previously mentioned, and there is thereby formed a drive to the gears 48, 51 for rotating the belt driving pulleys 42, 43, and driving the conveyor belt 22 in a reverse direction.

The jaw clutches 71, 79 are alternately operated by means of a lever 85 which is pivoted intermediate its ends on a pin 86 (Fig. 6). One end of the lever 85 is formed with a collar 87 in which there is pivotally secured a yoke 88 which has a depending pin 89 received in the collar 87. The yoke 88 embraces the female portion 72 of the jaw clutch 71, and engages the jaw clutch 71 when the lever 85 is swung about the pivot pin 86, in a counterclockwise direction as viewed in Fig. 4A. The other end of the lever 85 is similarly formed with a collar 90 in which there is pivotally secured a yoke 91 having a depending pin 92 received in the collar 90. The yoke 91 embraces the female portion 80 of the jaw clutch 79, and engages the jaw clutch 79 by sliding the female portion 80 thereof along the shaft 76 when the lever 85 is swung in a clockwise direction as viewed in Fig. 4A. A clutch operating handle 93 is secured to the side of the gear housing 47, and is connected to the link 85 by any suitable linkage to swing the link 85 in opposite directions on the pivot pin 86 to alternately operate the clutches 71, 79.

The conveyor belt 22 enters the head section 20 from the right, as viewed in Figs. 3A, 3B and is guided across the top of the head section 20. A plurality of troughing idlers 95 extend transversely across the top of the traction assembly 25 of the conveyor head section 20, and the conveyor belt 22 moves across these idlers 95, the belt 22 being guided and supported thereby. Each of the idlers 95 comprises a center idler roll 96 disposed on a substantially horizontal axis, and a pair of troughing idler rolls 97 disposed one at either side of the center roll 96, on axes extending outwardly and upwardly away from the ends of the center roll 96. Each of the rolls 96, 97 is supported for rotation on a frame member 98 which extends transversely of the head section 20. These idlers 95 form the conveyor belt 22 into a troughed configuration for the purpose of centering the load on the conveyor belt 22 and preventing the loss of material over the edges of the conveyor belt 22.

In its return run the conveyor belt 22 comes off the top of the belt driving pulley 42 and is guided by an idler roll 99 which extends transversely of the traction assembly 25 of the head section 20. The idler roll 99 rotates with a shaft 100, the ends of which are rotatably supported by suitable bearings 101. A centrifugal switch 102 is mounted on the traction assembly 25 adjacent one end of the shaft 100, and the centrifugal switch 102 is driven by the shaft 100 through a chain and sprocket driving connection 103. Thus, if the belt 22 is traveling at too great a rate of speed, it will operate the centrifugal switch 102 to disconnect the motor 55, thereby stopping the operation of the conveyor and calling attention to the fact that it is operating at too great a rate of speed. The operators of the conveyor can then make any necessary adjustments to restore the conveyor to operation at a safe speed. From the idler roll 99 the conveyor belt 22 is guided downwardly towards a laterally extending idler roll 104 at the bottom of the traction assembly 25. From the idler roll 104 the conveyor belt 22 is guided in a substantially horizontal path towards the tail section 21.

The conveyor tail section 21 comprises a main frame 110, at each side of which there is provided an endless crawler traction tread 111 trained about a drive sprocket wheel 112 and idler sprocket wheels 113. The idler sprocket wheels 113 are rotatably mounted on a slide 114 whereby it is possible to adjust the tension in the traction treads 111. The endless crawler traction treads 111 on each side of the tail section 21 are independently operable so that the tail section may be maneuvered. At the rear end of the main frame 110 there is provided a pair of motors 115, located one at either side of the main frame 110. Each of the motors 115 has its armature shaft connected to a gear box 116, the drive of which is connected to the drive sprocket 112 by chain and sprocket drive mechanism 117. Suitable control devices for operating the crawler traction treads 111 are disposed at the side of the tail section 21 at an operator's station 118.

It is seen in Figs. 8 and 9 that the endless crawler traction treads 111 are disposed close to each other on the main frame 110 of the tail section 21, whereby the tail section 21 is of relatively narrow width. The tail section 21 is constructed in this manner in order to facilitate the entry thereof into the mine, and to permit it to maneuver freely therein. Due to the space limitations in the mine, the tail section 21 is also of relatively low height so that it may freely travel through the mine.

The main frame 110 includes upright, longitudinally extending side plates 120, spaced from each other and disposed at the center of the tail section 21, and located between the endless crawler traction treads 111. Adjacent the bottom of the main frame 110 there is provided a bottom plate 121, and spaced above the bottom plate 121 is a top plate 122, the plates 121, 122 spanning the distance between the bottoms and tops, respectively, of the side plates 120. The side plates 120 and the bottom and top plates 121, 122 together form a track 123 extending longitudinally of the tail section 21. A sliding support member 125 is received within the tracks 123 and is adapted to reciprocate therein. The forward end of the support member 125 is formed with an end plate 126 to which there is secured a tongue 127 having an upright bore 128. The supporting member 125 is adapted to carry the tail pulley 130 of the conveyor, the conveyor belt 22 being trained around the tail pulley 130 at the tail end of the conveyor.

The tail pulley 130 is carried in a yoke 131 comprising a back member 132, having at each of its ends a forwardly extending arm 133, to each of which there is secured a pillow block 134. The pillow blocks 134 rotatably support the ends of a shaft 135, the tail pulley 130 being secured to the shaft 135 for rotation therewith. A clevis 136 is secured to the rear of the back member 132 and is mated with the tongue 127, with a pin 137 extending through the clevis 136 and the tongue 127 to thereby secure the yoke 131 and the tail pulley 130 to the supporting member 125. The assembly of the tongue 127 and the clevis 136 includes sleeve bearings 138 disposed in the bore 128, to permit the yoke 131 to swing freely relatively to the end of the supporting member 125. A plow type belt cleaner 140 is secured to the yoke 131 and is disposed in front of the tail pulley 130. The belt cleaner 140 is secured to the yoke 131 by a strap member 141 having parallel arms 142 which extend substantially parallel to the direction of travel of the conveyor belt 22, the ends of the arms 142 being pivotally secured to the arms 133 on the yoke 131 by pins 143. Thus the plow type belt cleaner 140 rests on the return run of the conveyor belt 22 by its own weight and will operate to scrape any loose material therefrom and guide such material to the sides of the conveyor belt 22 where it is discharged over the edges thereof.

The assembly of the tail pulley 130 also includes a training idler 144 for maintaining the conveyor belt 22 in proper alignment with the tail pulley 130. The training idler 144 comprises an idler roll 145 extending transversely of the conveyor belt 22 and mounted on brackets 139 (Fig. 12) secured to the arms 142 of the strap member 141. The idler roll 145 is freely rotatable. At either side of the conveyor belt 22 and adjacent each end of the idler roll 145 there is provided an idler roll 146 secured to the brackets 139 and the arms 142 of the strap member 141, on an upright axis, with the idler rolls 146 being so located that the peripheries thereof are in line with the plane of the return run of the conveyor belt 22. Thus, should the conveyor belt 22 shifts laterally and tend to go off the tail pulley 130, the edge of the return run of the conveyor belt 22 will engage the periphery of one or the other of the idler rolls 146, thereby tending to swing the yoke 131 about the axis of the pivot pin 137, which action will operate to restore the conveyor belt 22 to a centrally located position on the periphery of the tail pulley 130. This centering action may occur successively, and the total effect thereof will be to maintain the conveyor belt 22 centered in a lateral direction on the tail pulley 130 and thereby reduce the wear of the belt.

The sliding support member 125, in addition to supporting the weight of the yoke 131 and the tail pulley 130, exerts a pull on the yoke 131 and on the tail pulley 130 for the purpose of maintaining a predetermined amount of tension in the conveyor belt 22 so that the conveyor belt 22 will be properly driven by the belt drive pulleys 42, 43. For this purpose there is secured to the rear end of the sliding support member 125 by means of a pin 147 (Fig. 10) the piston 148 of a hydraulic cylinder and piston mechanism 149. The rear end of the cylinder 150 is secured to a post 151 by a pin 152. The post 151 is secured to the bottom plate 121 of the track 123, as by welding or the like, and forms a supporting member for the rear end of the cylinder and piston mechanism 149 and resists the force thereof. Hydraulic fluid under pressure is supplied to the cylinder and piston mechanism 149 for the purpose of operating the piston in such direction as to withdraw the piston rod 148 into the cylinder 150, whereby there will be a pull exerted on the sliding support member 125, and this pull will be transmitted to the tail pulley 130 for maintaining the conveyor belt 22 under tension.

The hydraulic circuit for operating the cylinder and piston mechanism 149 is illustrated in Fig. 13. A motor 155 is mounted on the main frame 110 at the rear of the tail section 21 between the motors 115, there being provided a pair of angularly disposed plates 156, which extend inwardly towards each other from the sides of the main frame 110 and form a cradle for the placement of the motor 155. The armature shaft of the motor 155 has connected thereto a drive shaft 157 which, in turn, is connected to a hydraulic pump unit 158, which is a combination hydraulic pump and fluid reservoir. The hydraulic pump 158 delivers fluid to a hydraulic line 159 through a check valve 160. The fluid from the line 159 flows to an accumulator 161 through the hydraulic line 162. The accumulator 161 is placed in the system to provide a steady supply of fluid to the system under constant pressure. The hydraulic line 163 delivers fluid to a hydraulic line 164 which, in turn, delivers the fluid to a hydraulic actuator 165. The hydraulic actuator 165 controls the operation of the motor 155 according to the pressure of the hydraulic fluid in the system. A hydraulic line 166 delivers hydraulic fluid to a pressure reducing valve 167. The output from the pressure reducing valve 167 is delivered to the cylinder and piston mechanism 149 through a hydraulic line 168, and operates the cylinder and piston mechanism 149 to exert a constant pull on the sliding support member 125 for the purpose of maintaining the conveyor belt 22 under tension. The hydraulic line 169 receives hydraulic fluid from hydraulic lines 170, 171, 172, and 173, each of which lines are drain lines from the various devices in the hydraulic system, the hydraulic line 169 conducting the fluid back to the hydraulic pump unit 158 to be recirculated.

The motor 155 drives the hydraulic pump unit 158 which supplies fluid under pressure through hydraulic lines 159, 162 to the accumulator 161. The hydraulic pump unit 158 builds up a supply of hydraulic fluid under constant pressure in the accumulator 161. The hydraulic fluid is supplied under constant pressure by the accumulator 161 through the hydraulic lines 162, 163, 164 to the hydraulic actuator 165. When the hydraulic fluid in the accumulator 161 and in the hydraulic lines 162, 163, 164 has reached a predetermined maximum value, the transmission of this fluid pressure to the hydraulic actuator 165, as aforementioned, will result in operation of the hydraulic actuator to stop the motor 155, the system thereafter operating by supply of hydraulic fluid under pressure from the accumulator 161. This fluid under pressure is supplied through the hydraulic line 166 to the pressure reducing valve 167 from which a hydraulic line 168 leads to the cylinder and piston mechanism 149. The pressure reducing valve 167 reduces the pressure of the fluid fed through the line 168 to the cylinder and piston mechanism 149. After the supply of hydraulic fluid, which was initially built up in the accumulator 161, is exhausted, the fluid pressure transmitted to the hydraulic actuator 165 will drop until it reaches a certain minimum value which will then cause operation of the hydraulic actuator 165 to start up the motor 155, thereby repeating the above described operation to again build up a supply of hydraulic fluid under pressure in the accumulator 161, until the hydraulic fluid in the system reaches the predetermined maximum value, at which point the hydraulic actuator 165 is operated to stop the motor 155.

The endless belt conveyor of this invention may extend very substantial distances as determined by the depth of the mining operation, and in order to provide support for the runs of the conveyor belt 22 between the head section 20 and the tail section 21, as well as to guide the runs of the conveyor belt 22, there is provided a plurality of belt supporting and guiding stands 23 (Fig. 14) which are placed at equally spaced intervals along the length of the conveyor between the head section 20 and the tail section 21. Each of these stands 23 comprises a pair of upright columns 174, 175 placed one at each side of the stand 23. The column 174 at one side of the stand 23, has a foot member 176 secured to the bottom thereof and extending to either side of the column 174, the foot member 176 being adapted to rest upon the floor of the mine and maintain the stand 23 in an upright position. The column 175 at the other side of the stand 23 has secured to its bottom a square plate member 177 which rests on the floor of the mine, and forms a base for supporting the column 175 thereon. Each column 174, 175 has a bracket 178 secured thereto and extending to one side of the stand 23 near the bottom thereof. A return idler roll 179, including a shaft 180 is mounted in the brackets 178 by engagement of the ends of the shaft 180 with the brackets 178. The return run 181 of the conveyor belt 22 rides along the return idler rolls 179 on the successive stands 23 and is supported and guided thereby.

A transverse cylindrical member 182 extends between the columns 174, 175 and is secured thereto by means of welding. A pair of spaced brackets 183 are secured to the member 182 adjacent the center thereof, and these brackets 183 receive and support the ends of a shaft 184 on which there is mounted for free rotation an idler roll 185. The length of the idler roll 185 is approximately equal to one-third of the distance between the columns 174, 175, and this idler roll is disposed on a substantially horizontal axis. At the opposite side of the cylindrical frame member 182, there are secured two brackets 186, and at the top of each of the columns 174, 175 there is secured a bracket 187. Each pair of brackets 186, 187 provides a support for the shaft 188 of an idler roll 189. The idler rolls 189, at each side of the stand 23, are disposed with their axes extending upwardly and outwardly from approximately the opposite ends of the idler roll 185.

The idler roll 185 and the two idler rolls 189 together form a troughing idler which is adapted to support the load carrying run 190 of the conveyor belt 22. The load carrying run 190 of the conveyor belt 22 is troughed for the purpose of centering the load transversely of the conveyor belt 22 and thereby preventing spillage of the load from the sides of the conveyor belt 22. Longitudinally extending rod members 191 extend between the respective columns 174, 175 of the successive stands 23, and these rod members 191 are releasably secured to the tops of the columns 174, 175 in any suitable manner to facilitate setting up and removing the stands 23 as the conveyor is extended or shortened. The rod members 191 serve to space the stands 23 and also prevent accidental tipping of the stands 23.

At the end of the head section 20 nearest the tail section 21, there is provided the belt reel carrier structure 194 for introducing an additional length of conveyor belt into the conveyor for the purpose of extending the same. This structure for extending the conveyor comprises a pair of brackets 195 located one at each side of the head section 20 and secured to the head section 20 by means of bolts 196. The brackets 195 pivotally support the belt reel carrier structure 194 as will appear in greater detail. A cross tube 197 extends between the brackets 195 and has the ends thereof rotatably supported in the brackets 195 so that the cross tube 197 may be oscillated relatively thereto. A pair of main arms 198, 199 extend forwardly from the cross tube 197 and are secured thereto as by welding or the like. The main arms 198, 199 are placed adjacent the ends of the cross tube 197, and within the brackets 195, for the purpose of receiving a belt reel therebetween as will be explained in greater detail hereinafter.

The main arms 198, 199 each has secured to the end thereof a bearing block 200. Each bearing block 200 slidably receives a centering bearing 201 which is slidable inwardly and outwardly within the bearing block 200. Each centering bearing 201 includes a key 202 which is seated in the underside of the centering bearing 201, and is adapted to slide in a slot 203 formed in the bearing block 200 for the purpose of guiding the sliding movement of the centering bearing 201 relatively to the bearing block 200. The side of each centering bearing 201 includes a set of gear teeth cut into the centering bearing 201 to form a rack 204. The bearing block 200 at the outboard end thereof is formed with a pair of arms 205, 206 between which there is placed a gear wheel 207, the teeth of which engage with the rack 204. An upright shaft 208 extends through the arms 205, 206 and through the bore of the gear 207. The gear 207 is secured to the shaft 208 by a transverse locking pin 209. The shaft 208 has secured to the upper end thereof a laterally extending crank 210 formed with an upright handle 211, with which the shaft 208 may be rotated to rotate in turn the gear 207, whereby the centering bearing 201 is reciprocated inwardly or outwardly with respect to the bearing block 200.

A ratchet wheel 212 is secured to the shaft 208 by a pin 213 immediately above the arm 205, the ratchet wheel 212 being rotated simultaneously with the rotation of the gear wheel 207. A pawl 214 is secured to the top of the bearing block 200 by means of a pin 215 in position to engage the teeth of the ratchet wheel 212. A stop block 216 is secured to the top of bearing block 200 by a pin 217. A spring 218 is disposed between the stop block 216 and the pawl 214 to resiliently bias the pawl 214 into engagement with the teeth of the ratchet wheel 212. Upon rotation of the shaft 208 to reciprocate the centering bearing 201 inwardly of the bearing block 200, the pawl 214 will simply ride over the teeth of the ratchet wheel 212 and will prevent reverse rotation of the shaft 208 by locking against the teeth of the ratchet wheel 212. When it is desired to move the centering bearing 201 outwardly with respect to the bearing block 200, the pawl is manually withdrawn from engagement with the teeth of the ratchet wheel 212 and the shaft 208 rotated in a reverse direction to reciprocate the centering bearing 201 outwardly.

The centering bearings 201 are adapted to engage a belt reel 220 and to rotatably support it between the main arms 198, 199. The reel carrier 194 comprising the transverse tube 197 and the main arms 198, 199 may be swung downwardly in the brackets 195 to position the centering bearings 201 adjacent the belt reel 220, which rests on the ground, for the purpose of engaging the centering bearings 201 therewith and raising the belt reel 220 off the ground into operative position. For this purpose there is provided a crank 221 secured to one end of the tube 197 adjacent the main arm 199.

The crank 221 extends generally upwardly and downwardly with respect to the transverse tube 197. The top of the crank 221 is formed with a stop block 222 which is adapted to abut an adjustable stop 223 in the form of a bolt on the head section 20, thereby limiting the counterclockwise movement of the crank 221, to place the main arms 198, 199 of the belt reel carrier 194 in a substantially horizontal plane when the crank 221 has reached its limit of movement in a counterclockwise direction, as viewed in Fig. 3B. The bottom of the crank 221 is formed with a clevis 224 within which there is pivotally secured the end of a piston rod 225 by means of a pin 226. The piston rod 225 is part of a hydraulic ram 227 which is secured to the side of the head section 20 by a pin 228. A hydraulic pump 229 is mounted on the side of the head section 20 adjacent the top thereof and is connected to the hydraulic ram 227 by a hydraulic line 230. The hydraulic pump 229 is manually operated by a pump lever 231 to supply hydraulic fluid under pressure through the hydraulic line 230 to the hydraulic ram 227 to extend the piston rod 225 and thereby swing the crank 221 in a counterclockwise direction, as viewed in Fig. 3B.

It will be understood that the belt reel carier 194 is normally in a lowered position in which the bearing blocks 200 and the centering bearings 201 are located at a distance above the ground substantially equal to the distance above the ground of the axis of the belt reel 220, so that the centering bearings 201 may be engaged therewith, and upon such engagement the hydraulic pump 229 is then manually operated to extend the piston rod 225 of the hydraulic ram 227 to operate the crank 221 for the purpose of raising the belt reel 220 on the ends of the main arms 198, 199 of the belt reel support.

The belt reel 220 is formed with a cylindrical hub 238 which extends between the side plates 232. The ends of the cylindrical hub 238 are formed with aligned journals 233, 234. Each of the journals 233, 234 comprises an outwardly facing, tapered bearing seat 235 which is adapted to receive the tapered end 236 of the centering bearings 201. With the tapered formation of the centering bearings 201 and of the bearing seats 235 in the hub 238, it will be apparent that the centering bearings 201 need not be exactly aligned with the journals 234 for engagement therewith, but that the centering bearings 201 and the journals 234 will automatically act to center themselves relatively to each other.

Upon engagement of the belt reel 220 with the centering bearings 201, the belt reel 200 is freely rotatable on the centering bearings 201 for a purpose to be described. The hub 231 includes a splice bar 237 to which one end of a length of conveyor belt is secured, it being understood that the ends of the length of conveyor belt each includes a similar splice bar, and that the splice bars may be joined by means of a transversely extending pin in the manner well-known in the art. The splice bar 237 anchors one end of a length of conveyor belt to the reel hub 238, so that the length of conveyor belt may be wound on the reel 220.

For the purpose of extending the conveyor of this invention, a length of conveyor belt such as that wound on the belt reel 220 is added to the conveyor belt 221, and the distance between the head section 20 and the tail section 21 increased to allow for the additional length of conveyor belt added to the conveyor. The process of adding the length of conveyor belt to the conveyor consists of mounting the belt reel 220 on the ends of the main arms 198, 199 and raising the belt reel 220 off the ground by operation of the crank 221, so that the belt reel will be freely rotatable on the centering bearings 201, the belt reel by this operation being placed in alignment with the endless conveyor belt 22. It will be understood that to form the endless conveyor belt 22 there is incorporated therein a spliced connection 240 of the ends thereof (Fig. 15). This spliced connection 240 is broken adjacent the belt reel carrier structure 194 and the free end of belt closest to the head section 20 is temporarily secured to a splice bar 241 on the end of the head section 20. The other free end of belt is spliced to the loose end of the length of conveyor belt caried on the belt reel 220. The belt reel carrier structure 194 is so disposed that the belt reel 220 is aligned with the conveyor belt 22. With the conveyor belt 22 connected as aforementioned the tail section 21 is then operated to tram the tail section 21 in a direction away from the head section 20, thereby drawing the length of conveyor belt off the belt reel 220 and pulling the length of conveyor belt from the reel 220 into the load carrying run 190 of the conveyor belt 22. When the full length of conveyor belt has been withdrawn from the reel 220, the end thereof which is connected to the splice bar 237 is released therefrom, and the end of the conveyor belt 22 which had been temporarily connected to the splice bar 241 is released from that splice bar, and the free ends of conveyor belt so formed are joined one to the other with a transversely extending pin joining the interlocking splice elements on the respective ends of the conveyor belt. As the final step in the process of extending the conveyor, additional stands 23 are added between the head section 20 and the tail section 21 to support the runs of the conveyor 22. It will be understood that as many stands 23 are added as may be necessary to fully cover the distance between the head section 20 and the tail section 21.

The procedure for withdrawing a length of conveyor belt from the conveyor for the purpose of shortening the conveyor is exactly opposite to that described above for extending the conveyor, with the exception that the belt reel 220 is driven to pull the length of conveyor belt from the load carrying run 190 of the conveyor by winding it on the reel 220. The structure for accomplishing this operation will now be described.

In the reel carrier 194 the main arm 198 has secured thereto a laterally extending extension arm 244 to the end of which there is secured a forwardly extending bearing supporting arm 245. The end of the arm 245 has secured thereto a bearing housing 246 provided with a cylindrical bearing sleeve 247. The bearing sleeve 247 rotatably supports a shaft extension 248 of the inner driving hub 249 of the clutch 250. The shaft extension 248 is formed with a bore 251 which extends through the center of the inner driving hub 249. The end of the bore 251 at the end of the shaft extension 248 is formed with a splined portion 252. A stub shaft 253 extends through the bore 251 and is of such length as to extend from the end of the shaft extension 248 to the inner end of the journal 234. The end of the stub shaft 253, disposed within the shaft extension 248, is formed with a splined portion 254 which mates with the splined portion 252 of the shaft extension 248. The stub shaft 253 is thereby rotatable with the shaft extension 248 and the inner driving hub 249, and may also be reciprocated relatively to the shaft extension 248. For this purpose the end of the stub shaft 253 is formed with a knob 255 by which it may be manually pulled or pushed to slide the stub shaft 253 within the bore 251. The centering bearing 201 is hollow and formed with a cylindrical bore 256 within which the stub shaft 253 is fitted, and the stub shaft 253 is freely rotatable within the bore 256. The end of the stub shaft 253 is formed with a splined portion 257 that fits within and mates with the splined bore 258 of the journal 234. Thus, there is established a driving connection by means of the stub shaft 253 from the inner driving hub 249 of the clutch 250 to the journal 234 on the reel 220, to thereby drive the belt reel 220.

The inner driving hub 249 is mounted within the outer drive housing 259 of the clutch 250. Sleeve bearings 278 are provided at each side of the outer drive housing 259 between the latter and the inner drive hub 249 to permit relative rotation of the outer drive housing 259 and the inner drive hub 249. A set of outer clutch discs 260 are drivingly connected to the outer drive housing 259, and a set of inner clutch discs 261 are drivingly connected to the inner drive hub 249, the clutch discs 260, 261 being alternated in the well-known manner and being forced together by a plurality of axially extending coil springs 262 for frictional engagement of the inner and outer clutch discs 260, 261 to thereby form a driving connection between the outer drive housing 259 and the inner drive hub 249.

The outer drive housing 259 has a sprocket 263 formed integrally therewith. A driving chain 264 (Fig. 18) engages with the teeth of the sprocket 263, and forms a driving connection between the sprocket 263 and a driven sprocket 265 contained within a gear case 266 supported at the side of the head section 20. The sprocket 265 is mounted on a common shaft with a larger sprocket 267 which is connected by a driving chain 268 to a sprocket 269. The sprocket 269 is formed integrally with a male jaw clutch portion 270 which is slidable in an axial direction to engage with the female jaw clutch portion 271. The female jaw clutch portion 271 is at all times driven while the male jaw clutch portion 270 and the sprocket 269 are normally idle. A crank 272 is pivotally supported at one end by a pin 273 on the head section 20, and the opposite end of the crank 272 is secured to a yoke 274 by a pin 275. The yoke 274 embraces the male jaw clutch portion 270 and is operated by the crank 272 to engage the male clutch portion 270 with the female jaw clutch portion 271, to thereby form a driving connection to the sprocket 269, and through the drive, previously described, to operate the clutch 250 for rotating the stub shaft 253 and the belt reel 220 to wind the belt thereon. A handle 276 is provided for operating the crank 272, and the handle 276 includes a detent device 277 for securing the handle in position with the sprocket 269 idle.

As the conveyor belt is wound onto the reel 220 the linear speed of the belt approaching the reel 220 tends to increase as the diameter of the belt previously wound on the belt reel 220 increases. While this is happening the rotative speed of the belt reel 220 remains constant. It is for this reason that the clutch 250 is provided in the drive to the belt reel 220, the clutch providing slippage in the drive to allow for any differences in the rotative speed of the belt reel 220 and the linear speed of the conveyor belt as it is wound on the reel 220. The tail section 21 is trammed towards the head section 20 as the length of conveyor belt is wound on the reel 220, and when the full length of conveyor belt has been wound on the reel 220, it is removed from the conveyor belt 22 and the free ends of the latter spliced to form the endless belt.

By the instant invention there is provided a conveyor which is particularly well adapted for use in mines as a room conveyor, and is capable of being readily extended for a substantial distance into the mine as the mining operation progresses. The conveyor comprises an endless belt conveying element, and the conveyor is extended by adding a length of conveyor belt to the conveying element and splicing the length of conveyor belt into the conveying element to form a part thereof. The additional lengths of conveyor belt for extending the conveyor are supplied on reels, and as many of these reels of conveyor belt are provided as may be necessary to extend the conveyor the required distance. The conveyor includes a reel carrier structure which is adapted to engage the reel and lift it off the ground and position the reel in line with the endless conveyor belt, so that the length of conveyor belt may be reeled from the reel into the run of the conveyor belt to become a part thereof. The carrier for the belt reel also includes means for rotating the belt reel so that a length of conveyor belt can be wound on the belt reel, when it is desired to remove a length of conveyor belt from the run of the endless conveyor belt to shorten the conveyor. It will be apparent to those skilled in the art that the conveyor of the instant invention is very easily extended by a very simple process that involves essentially the addition of a length of conveyor belt to the endless belt conveying element, making this conveyor especially well suited for use in underground mines.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. An endless belt conveyor comprising opposite end sections each including means for guiding an endless belt conveying element, an endless belt conveying element extending between said end sections and guided thereby, a carrier supported by one of said end sections, said one end section including means for raising and lowering the carrier, a reel having a length of conveyor belt wound thereon, said carrier including means adapted to engage the reel for raising and lowering the reel with the carrier, said carrier being disposed transversely of the endless belt conveying element for holding the reel in line with the run of the endless belt conveying element for reeling the length of belt from the reel into the run of the endless belt conveying element.

2. An endless belt conveyor comprising opposite end sections spaced from each other and each including means for guiding an endless belt conveying element, an endless belt conveying element extending between said end sections and guided thereby, a carrier disposed between said end sections and supported by one of said end sections, a reel having a length of conveyor belt wound thereon, said carrier including means for rotatably suporting the reel on the carrier, said one end section including means for raising and lowering the carrier and the reel, said carrier supporting the reel in line with the run of the endless belt conveying element for reeling the length of belt from the reel into the run of the endless belt conveying element.

3. An endless belt conveyor comprising a head section and a tail section spaced from each other and each including means for guiding an endless belt conveying element, an endless belt conveying element extending between said head and tail sections and guided thereby, a carrier supported on the head section and disposed between the latter and the tail section, a reel having a length of conveyor belt wound thereon, said carrier including means adapted to engage and rotatably support the reel, said head section including means for raising and lowering the carrier and the reel, said carrier being disposed transversely of the run of the endless belt conveying element and supporting the reel in line with the run of the endless belt conveying element for reeling the length of belt from the reel into the run of the endless belt conveying element, said endless belt conveying element including means for breaking the belt to provide a free end of belt for attaching the free end of the belt to an end of the conveyor belt on the reel, and means for tramming the tail section away from the head section for reeling the length of belt from the reel into the run of the endless belt conveying element.

4. An endless belt conveyor comprising opposite end sections spaced from each other and each including means for guiding an endless belt conveying element in spaced upper and lower runs, an endless belt conveying element extending between said end sections and guided thereby in spaced upper and lower runs, a carrier disposed between said end sections and supported by one of said end sections intermediate the upper and lower runs of the endless belt conveying element, pivot means pivotally supporting the carrier on said one end section for up and down swinging movement, said one end section including means for raising and lowering the carrier on the pivot means, a reel having a length of conveyor belt wound thereon, said carrier including means adapted to engage and rotatably support the reel intermediate the upper and lower runs of the endless belt conveying element, said carrier being disposed transversely of the endless belt conveying element and supporting the reel in line with the run of the endless belt conveying element for reeling the length of belt from the reel into the run of the endless belt conveying element.

5. An endless belt conveyor comprising opposite end sections spaced from each other and each including means for guiding an endless belt conveying element in spaced upper and lower runs, an endless belt conveying element extending between said end sections and guided thereby in spaced upper and lower runs, a carrier disposed between said end sections and supported by one of said end sections intermediate the upper and lower runs of the endless belt conveying element, pivot means pivotally supporting said carrier on said one end section for up and down swinging movement, a crank connected to said pivot means, hydraulic power means for oscillating the crank to raise and lower the carrier, a reel having a length of conveyor belt wound thereon, said carrier including means adapted to engage and rotatably support the reel intermediate the upper and lower runs of the conveyor belt, said carrier being disposed transversely of the endless belt conveying element and supporting the reel in line with the run of the endless belt conveying element for reeling the length of belt from the reel into the run of the endless belt conveying element.

6. An endless belt conveyor comprising opposite end sections spaced from each other and each including means for guiding an endless belt conveying element, an endless belt conveying element extending between said end sections and guided thereby, a carrier disposed between said end sections and supported by one of said end sections, said one end section including means for raising and lowering the carrier, a reel for winding a length of conveyor belt thereon, said carrier including means adapted to engage and rotatably support the reel, said carrier including means for rotating the reel on the carrier to wind a length of conveyor belt thereon, said carrier being disposed transversely of the endless belt conveying element and supporting the reel in line with the run of the endless belt conveying element for winding the length of conveyor belt from the run of the endless belt conveying element onto the reel.

7. An endless belt conveyor comprising opposite end sections spaced from each other and each including means for guiding an endless belt conveying element, an endless belt conveying element extending between said end sections and guided thereby, a carrier disposed between said end sections and supported by one of said end sections, said one end section including means for raising and lowering the carrier, a reel for winding a length of conveyor belt thereon, said carrier including means adapted to engage and rotatably support the reel, said carrier including a driving member disposed on the axis of the reel, said driving member being selectively engageable with the reel for rotating the reel to wind a length of conveyor belt thereon, said carrier being disposed transversely of the endless belt conveying element and supporting the reel in line with the run of the endless belt conveying element for winding the length of the conveyor belt from the run of the endless belt conveying element onto the reel.

8. An endless belt conveyor comprising a head section and a tail section spaced from each other and each including means for guiding an endless belt conveying element, an endless belt conveying element extending between said head and tail sections and guided thereby, a carrier disposed between said head and tail sections and supported by said head section, said head section including means for raising and lowering the carrier, a reel for winding a length of conveyor belt thereon, said carrier including means adapted to engage and rotatably support the reel, said carrier including a driving member disposed on the axis of the reel, means for selectively engaging the driving member with the reel for rotating the reel to wind a length of conveyor belt thereon, means for operating the driving member including a clutch, said carrier being disposed transversely of the endless belt conveying element and supporting the reel in line with the run of the endless belt conveying element for winding the length of conveyor belt from the run of the endless belt conveying element onto the reel, and said tail section including means for tramming the tail section towards the head section as the length of conveyor belt is wound on the reel.

9. An endless belt conveyor comprising opposite end sections spaced from each other and each including means for guiding an endless belt conveying element in spaced upper and lower runs, an endless belt conveying element extending between said end sections and guided thereby in spaced upper and lower runs, a carrier disposed between said end sections and supported by one of said end sections intermediate the upper and lower runs of the endless belt conveying element, said one end section including means for raising and lowering the carrier, a reel having a length of conveyor belt wound thereon, said carrier including means adapted to engage and rotatably support the reel intermediate the upper and lower runs of the endless belt conveying element, said carrier being disposed transversely of the endless belt conveying element and supporting the reel in line with the run of the endless belt conveying element for reeling the length of belt from the reel into the run of the endless belt conveying element.

10. An endless belt conveyor comprising opposite end sections spaced from each other and each including means for guiding an endless belt conveying element, an endless belt conveying element extending between said end sections and guided thereby, a carrier disposed between said end sections and supported by one of said end sections, a reel having a length of conveyor belt wound thereon, said carrier including means for rotatably supporting the reel on the carrier, said one end section including means for raising and lowering the carrier and the reel, said carrier supporting the reel in line with the run of the endless belt conveying element, and means for tramming one of the end sections away from the other of the end sections for reeling the length of belt from the reel into the run of the endless belt conveying element.

References Cited in the file of this patent

UNITED STATES PATENTS

| Number | Name | Date |
|---|---|---|
| 954,475 | Sessions | Apr. 12, 1910 |
| 2,393,563 | Petterson | Jan. 22, 1946 |
| 2,576,217 | Eggleston | Nov. 27, 1951 |
| 2,591,089 | Moon | Apr. 1, 1952 |
| 2,616,636 | Aden | Nov. 4, 1952 |
| 2,648,424 | Bateman | Aug. 11, 1953 |
| 2,725,976 | Madeira | Dec. 6, 1955 |
| 2,762,492 | Hopkins | Sept. 11, 1956 |
| 2,774,462 | Poundstone | Dec. 18, 1956 |
| 2,846,051 | Craggs et al. | Aug. 5, 1958 |